United States Patent [19]

Ragard

[11] Patent Number: 4,938,087
[45] Date of Patent: Jul. 3, 1990

[54] ZERO BACKLASH POSITIONING SYSTEM FOR A MOVABLE LINEAR AXIS

[75] Inventor: Phillip A. Ragard, Binghamton, N.Y.

[73] Assignee: Universal Instruments Corporation, Binghamton, N.Y.

[21] Appl. No.: 359,325

[22] Filed: May 31, 1989

[51] Int. Cl.$^5$ .................... F16H 19/06; F16H 55/28; B25J 5/02

[52] U.S. Cl. .................... 74/89.21; 33/1 M; 74/422; 414/749; 901/16; 901/21; 475/183

[58] Field of Search ............... 33/1 M; 74/89.2, 89.21, 74/89.22, 422, 798; 414/749; 901/16, 17, 21; 248/661; 269/73

[56] References Cited

U.S. PATENT DOCUMENTS

| | | | |
|---|---|---|---|
| 2,344,078 | 3/1944 | Brissonnet et al. | 74/798 |
| 2,484,605 | 10/1949 | Boucher | 74/798 |
| 3,060,767 | 10/1962 | Parrett | 74/798 |
| 3,850,043 | 11/1974 | Tarbox | 33/1 M X |
| 4,229,136 | 10/1980 | Panissidi | 901/16 X |
| 4,274,801 | 6/1981 | Herb et al. | 414/749 X |
| 4,721,005 | 1/1988 | Yoshiji et al. | 901/16 X |
| 4,753,119 | 6/1988 | Kuspert | 74/89.21 |

FOREIGN PATENT DOCUMENTS

| | | | |
|---|---|---|---|
| 160923 | 11/1985 | European Pat. Off. | 74/89.21 |
| 2910373 | 9/1980 | Fed. Rep. of Germany | 74/89.21 |

Primary Examiner—Allan D. Herrmann
Attorney, Agent, or Firm—Fidelman & Wolffe

[57] ABSTRACT

A linear axis (cantilevered beam) is longitudinally displaceable relative to its support which, in turn, is displaceable laterally along an overhead frame so as to provide X-Y positioning for pick and place spindles and similar tools which are attached to the beam. A particular structural combination for accomplishing this involves a low inertia servomotor driving a speed reducer which, in turn, directly drives a short endless timing belt which, in turn, intermeshes with and drives a toothed rack in order to provide reliable, with zero backlash, high accuracy X-Y positioning of the tools. Features of the structural arrangement allow the use of component parts requiring much less precision, and thus much less cost, of manufacture than prior art, zero backlash, linear axis positioning systems.

6 Claims, 6 Drawing Sheets

ZERO BACKLASH POSITIONING SYSTEM FOR A MOVABLE LINEAR AXIS

BACKGROUND AND SUMMARY OF THE INVENTION

The invention is in the particular field of equipment for transferring electrical components to printed circuit boards automatedly for assembly therewith. However, it is contemplated that the structure is readily adaptable to other electrical component handling equipment and to similar robotic applications of a more general nature.

Such transferring generally involves cyclical moving of a pick and place head such as a vacuum spindle from a "picking" station at which an electrical component is picked up to a "placing" station at which the component is placed down at a selected location on the face of the circuit board. The X-Y positioning of the selected circuit board location relative to the vacuum spindle is accomplished by moving either the circuit board or the spindle in X and Y, or moving both in at least one of the directions.

Devices for repositioning the pick and place head in X and Y with the speed, accuracy, reliability, and repeatability required by the industry have involved mounting the head for movement along and on precision ground ways (in the X direction), which are supported at each end for movement perpendicular thereto (in the Y direction), with these movements being along the axes of precision ground lead screws (defining the X and Y axes) via mating ball nuts. Inherent to these devices are the complicated and costly drive mechanisms necessary to accomplish the linear travel of an axis with the precision required.

It is also known in the prior art to use harmonic drive gearing for a reducing unit in precision X-Y positioning systems. However, such units are limited to an input of only about 2000 rpm and can provide a low end reduction ratio of only about 50:1. These limits compare unfavorably to a prototype of the instant invention which accepted an input of 4800 rpm and provided the low end reduction ratios of 10:1-15:1 which are desirable for servos. Further, the higher inertia of the harmonic drive unit causes more energy to be consumed in the power train. The necessary reduction would be very difficult to achieve with the harmonic drive and, if achievable, would be much more expensive than that of the instant invention.

Thus, it is an object of the invention to provide reliable, high accuracy X-Y positioning of a moveable linear axis without the need for the precision required of the component parts of prior art devices. This and other objects of the invention will become more apparent from the following detailed description, drawings, and claims of the invention.

BRIEF SUMMARY OF THE INVENTION

A linear axis (cantilevered beam) is longitudinally displaceable relative to its support which, in turn, is displaceable laterally along an overhead frame so as to provide X-Y positioning for pick and place spindles and similar tools which are attached to the beam. A particular structural combination for accomplishing this involves a low inertia servomotor driving a speed reducer which, in turn, directly drives a short endless timing belt which, in turn, intermeshes with and drives a toothed rack in order to provide reliable, with zero backlash, high accuracy X-Y positioning of the tools. Features of the structural arrangement allow the use of component parts requiring much less precision, and thus much less cost, of manufacture than prior art, zero backlash, linear axis positioning systems.

DETAILED DESCRIPTION OF THE INVENTION

Figure 1:
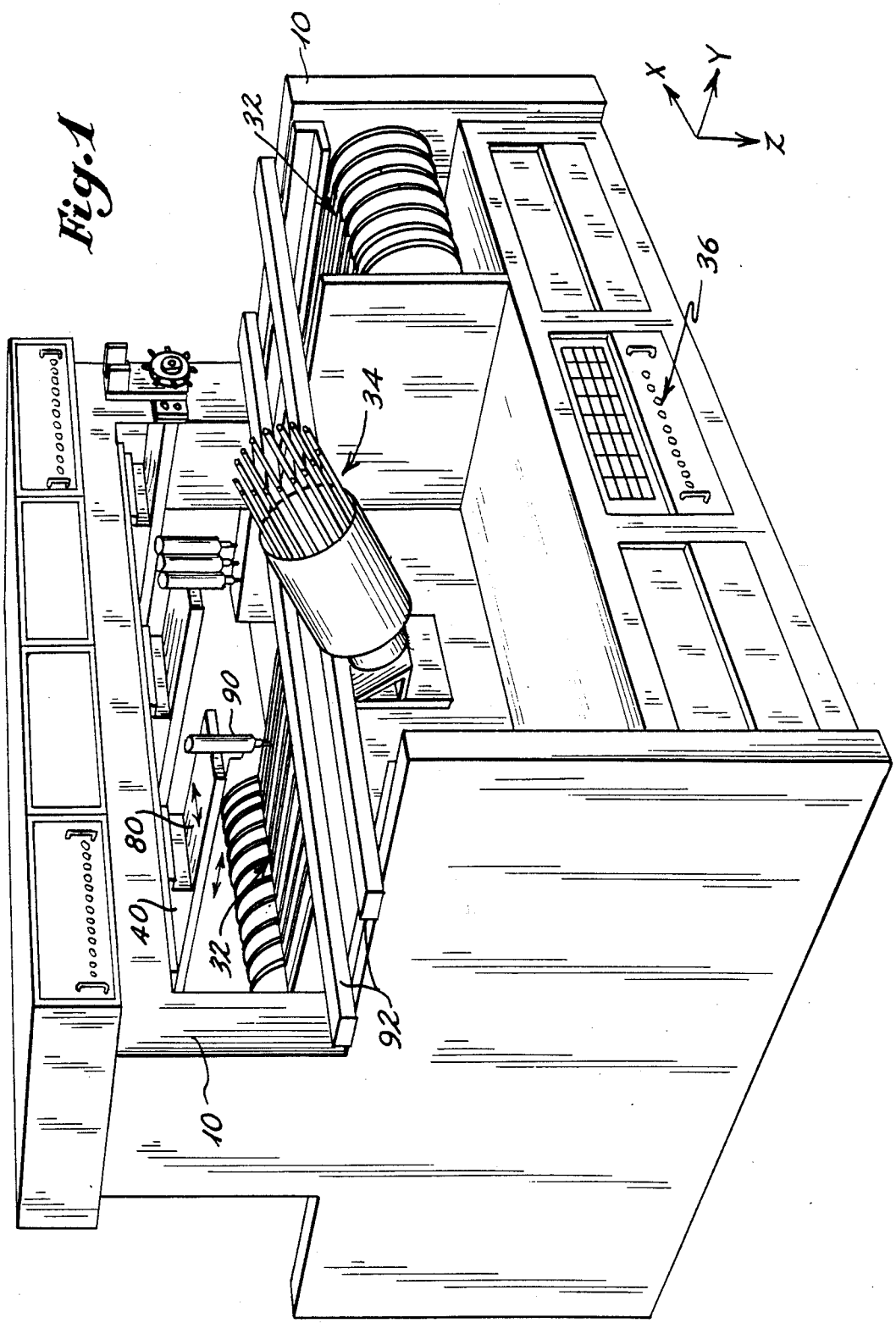
FIG. 1 is a perspective of a machine incorporating the instant invention.

Referring to FIG. 1, circuit boards (not shown) are fed along feed supports 92 for population with electrical components by means of pick and place spindles 90. Spindles 90 are attached to a cantilevered arm (linear axis) which is displaceable (in the direction of the arrows thereon) and, in turn, is supported by a support member 40 which is laterally displaceable along overhead frame 10 in the direction of the arrows indicated on support member 40. Thus, a pick and place head 90 is X-Y positionable in order to retrieve components from a pick-up station and place them at a selected location on a circuit board, under the command of a controller 36.

Various forms of electrical component supplies may be utilized for the machine, such as the reels of taped components 32 and the sticks of components which are mounted on a turret at 34. Additionally, vibratory component feeders (not shown) may be used for component supply.

Figure 3:
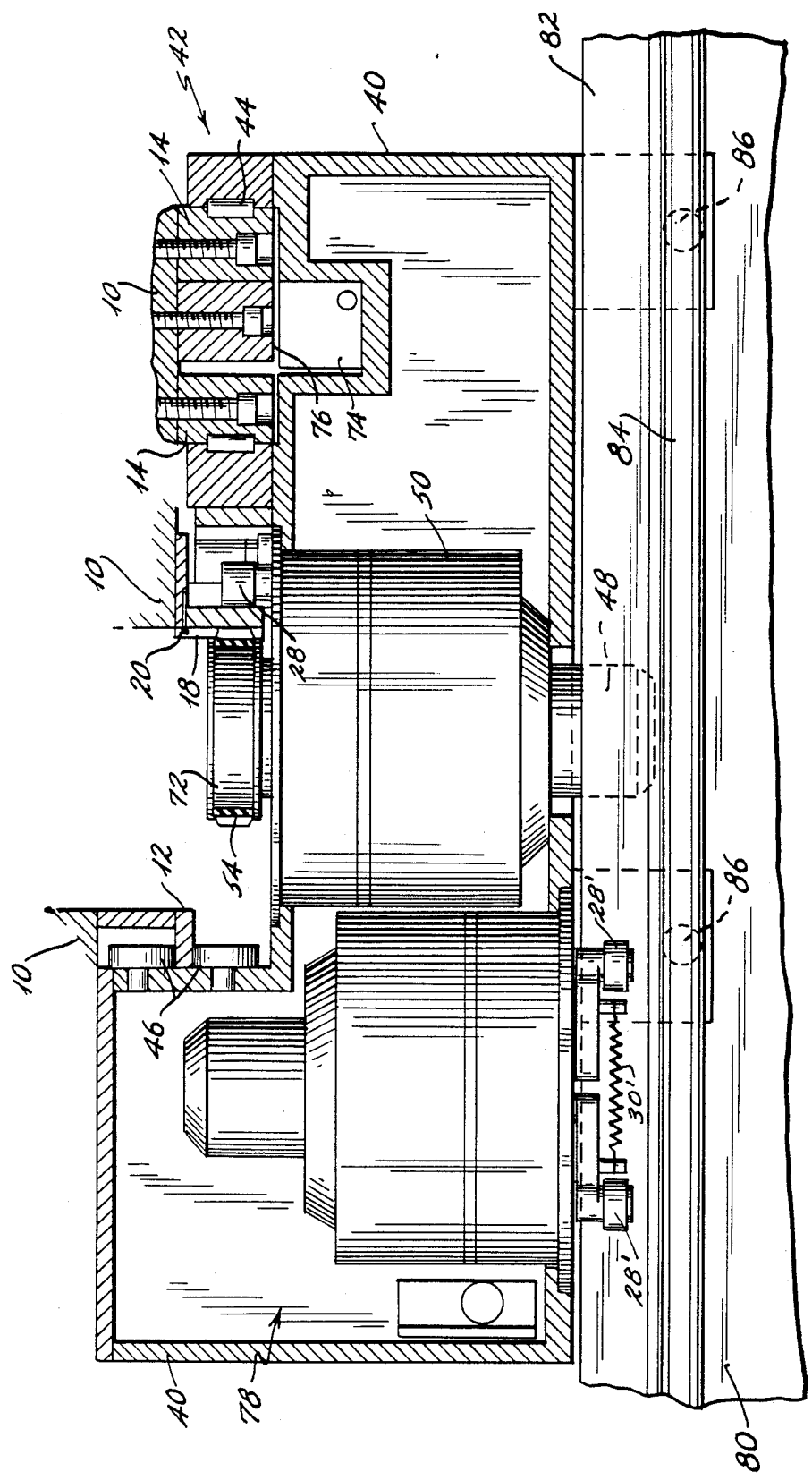
FIG. 3 is a cross section, as viewed generally in the direction of arrows 3—3 of FIG. 2.
Figure 4:
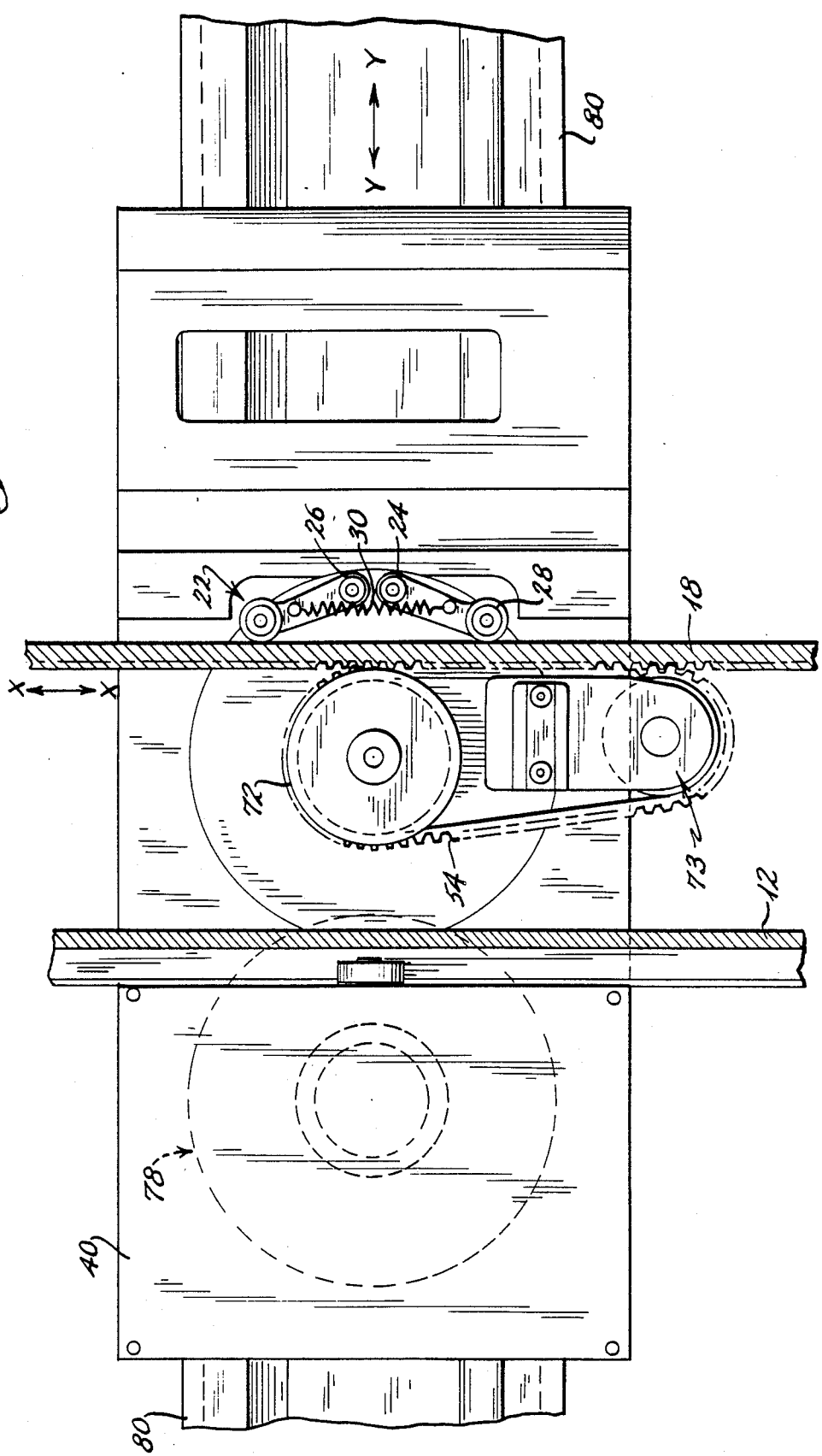
FIG. 4 a top plan view of FIG. 3.

Turning to FIGS. 3 and 4, support 40 is suspended from frame 10 by means of front rails 14 and rear rail 12 which define the X axis movement of support 40 and, hence, arm 80. A toothed rack 18 is hinged to the frame 10 at hinge 20, and a spring loading mechanism 22 biases rack 18 into engagement with the timing belt 54. Thus, should guide rails 12 and 14 and their respective wheel bearings 46 and roller bearing 44 allow for travel which is not exactly parallel with the rack 18 over the functional length thereof, the spring biasing of the rack 18 into engagement with timing belt 54 will maintain proper engagement of the teeth of belt 54 and rack 18 and thus maintain constant torque on the speed reduction unit 51 and the servomotor 50. Frame 10 also has an encoding bar 76 extending along the length of front rails 14; and support member 40 contains a reader 74 for monitoring bar 76 and thus the position of support 40 as it traverses frame 10.

Referring to FIG. 4, the spring loading mechanism 22 comprises arms 24 pivotal about points 26 and having wheel bearings at the ends distal from pivot points 26, with a spring 30 in tension between the pivotal arms 24 so as to bias them into engagement with rack 18.

A tachometer 48 facilitates rate control in accordance with controller 36 (FIG. 1).

Figure 6:
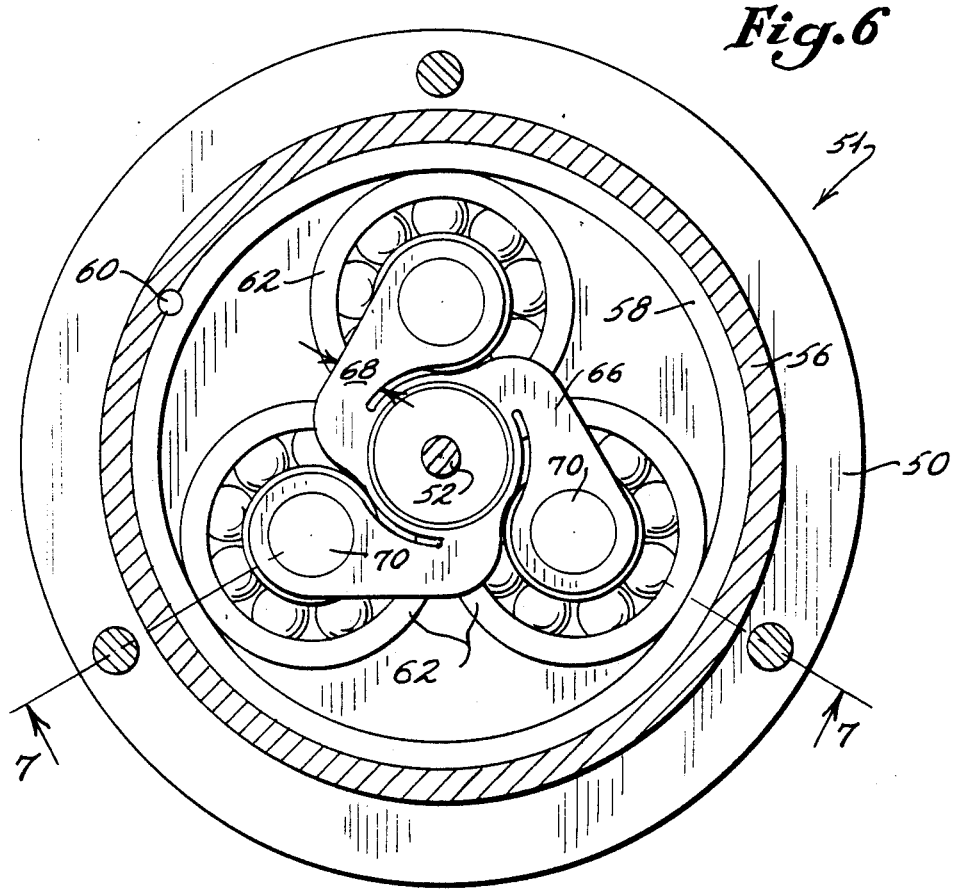
FIG. 6 a plan view of the inside of the speed reducing unit.
Figure 7:
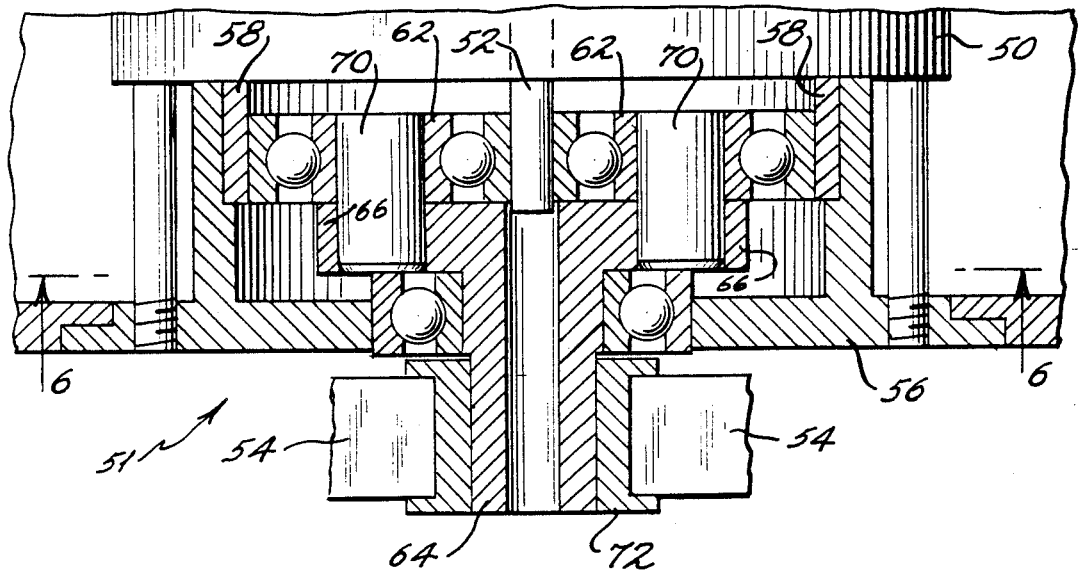
FIG. 7 a cross section, as viewed generally in the direction of arrows 7—7 of FIG. 6.

Referring to FIGS. 6 and 7, the speed reduction unit 51 comprises three wheel bearings 62 attached by means of pins 70 to lateral arms 66 of an output shaft 64. Lateral arms 66 have reduced portions 68 (FIG. 6) so that arms 66 may flex generally radially of a drive pin 52 of motor 50 so as to maintain a force at the point of tangency of each wheel bearing 62 with the centrally arranged drive pin 52, with this force being sufficient for rotating output shaft 64 in concert with drive pin 52 without relative slipping therebetween. A flexible ring 58 surrounds the triad of wheel bearings 62 and is prevented from rotating relative to housing 56 by means of pin 60 (FIG. 6). Although not indicated in the drawings, the internal diameter of flexible ring 58 is sufficiently less than that of a circle containing the locus of outer points of tangency of wheel bearings 62. Thus, flexible ring 58 is distorted somewhat triangularly in shape so as to preload the wheel bearings 62 into engagement with drive pin 52.

As seen in FIGS. 4 and 7, the smooth side of timing belt 54 is wrapped around a pulley 72, which is attached to output shaft 64, and a tensioning pulley 73 so as to present a generally straight portion of timing belt 54 for intermeshing engagement with rack 18 (FIG. 4).

Figure 2:
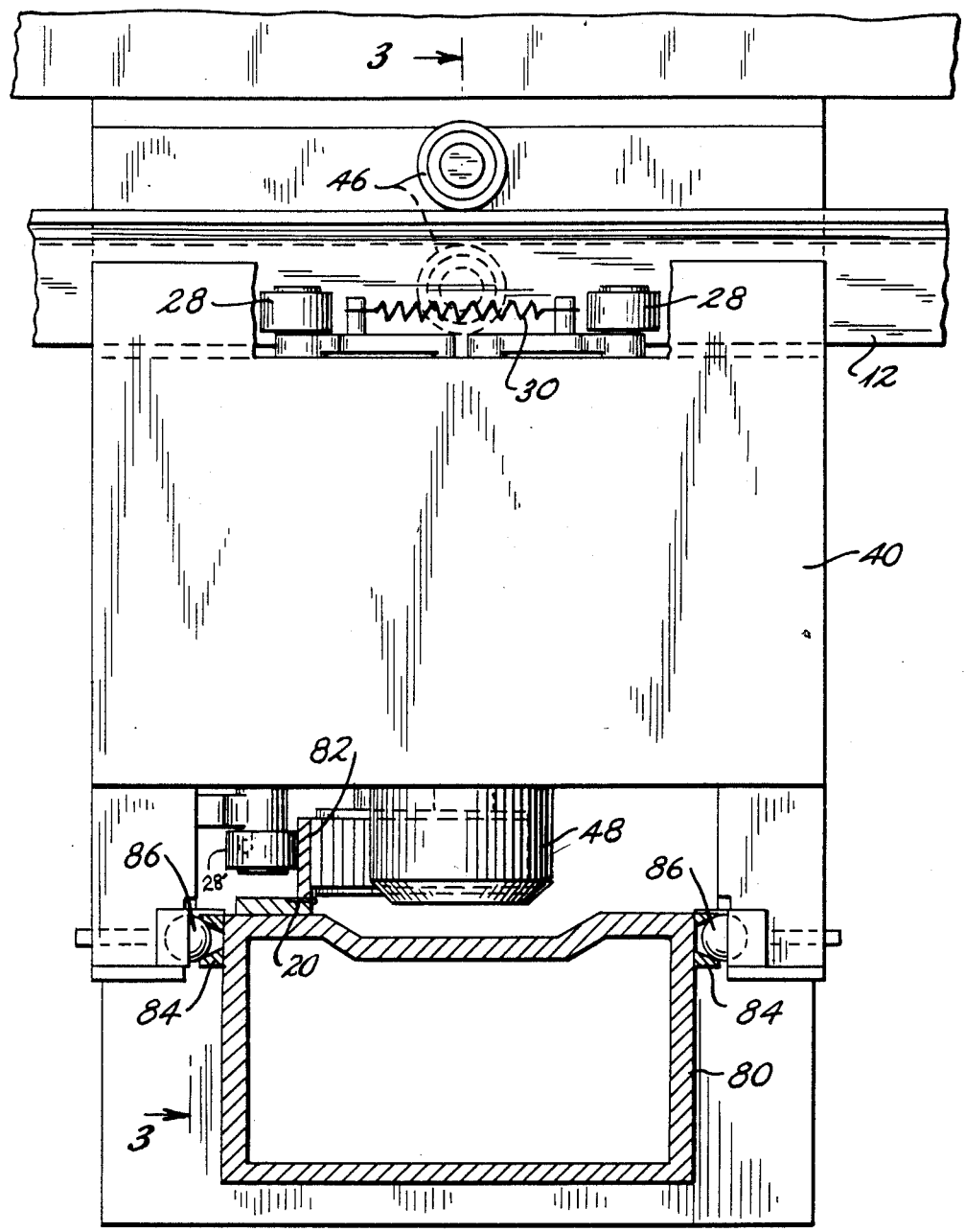
FIG. 2 is a partial front elevation of one of the cantilevered beams of FIG. 1.
Figure 5:
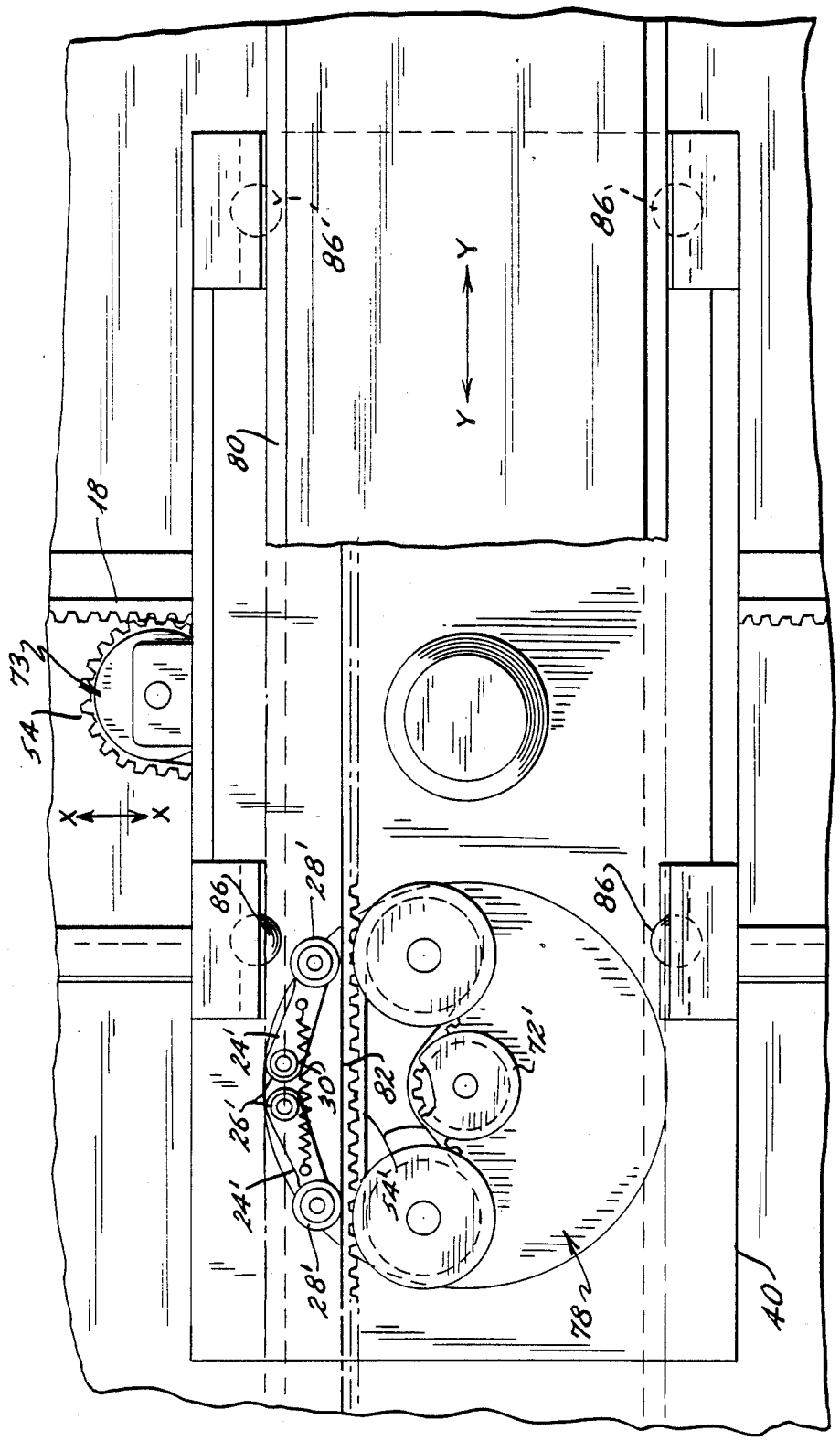
FIG. 5 a bottom plan view of the device of FIG. 3.

The description so far has dealt with the drive for moving a support 40 in the X direction as indicated in FIGS. 4 and 5. A similar drive mechanism is provided for movement of the arm 80 in the Y direction orthogonal to support member 40. This second drive mechanism is generally indicated at 78 in the drawings and, as seen in FIG. 2, the hinged rack 82 is attached to arm 80 for movement therewith.

FIG. 5 illustrates an alternative endless belt arrangement for transferring drive from the speed reduction unit to the hinged rack 82, although the same structure as illustrated in FIG. 4 could be utilized here also. As seen in FIG. 5, a structural arrangement is provided that allows a pinion gear 72' to engage the toothed outer portion of timing belt 54 (as opposed to the pulley 72 of FIG. 4 engaging the untoothed, inner side of timing belt 54). It is contemplated also that the timing belt 54 of FIG. 4 could be toothed on both sides such that pinion gears may be used in place of members 72 and 73 of FIG. 4.

Thus, the drive mechanism of the instant invention provides zero backlash for moving linear axes much less expensively than that provided by the prior art devices.

In a prototype of the invention, the Universal Instruments Corporation VME controller having part code 8224A was used. Also, the high stiffness-to-weight ratio required of the cantilevered beam 80 demands a rather critical material composition of the beam, and the prototype used a carbon fiber material like that manufactured by Union Carbide and comprising unidirectionally layed up carbon fabric.

Another advantage of the inventive structure over the prior art is the ease with which support 40 is assembled with and disassembled from frame 10, and the frontmost rail 14 is easily bolted to or unbolted from frame 10 in order to attach or release support 40.

Having described the invention, it will be seen that the objects set forth above and made apparent from the preceding description are efficiently obtained and, since certain changes may be made in carrying out the above method and in the construction set forth without departing from the scope of the invention it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, we claim:

1. An apparatus for providing precision linear displacement of an axis relative to a support, and comprising in combination:
   a drive mechanism having a servomotor attached to and moveable with one of said axis and said support, and a rack attached to and moveable with the other of said axis and said support, said rack being attached hingedly so as to be pivotal about a pivot axis which is parallel longitudinally to said rack;
   a speed reducer operatively associated with said servomotor and providing direct drive to a timing belt;
   said timing belt intermeshing with said rack such that forward and reverse rotation of said motor provides to and fro relative linear motion, respectively, between said axis and said support so as to displace said axis linearly along a Y coordinate and longitudinally of said rack; and
   means for biasing said rack about said pivot axis toward said timing belt in order to maintain contact between teeth of said rack and said belt.

2. An apparatus as in claim 1, wherein said drive mechanism comprises a first drive mechanism, and further comprising:
   a frame; and
   a second drive mechanism similar to said first drive mechanism and operatively associated with said support and said frame so as to provide relative movement therebetween and linear displacement of said axis relative to said frame and along an X coordinate orthogonal to said Y coordinate.

3. An apparatus as if claim 2, and further comprising:
   a beams suspended and cantilevered from said support and containing said axis.

4. An apparatus for providing precision linear displacement of an axis relative to a support, and comprising in combination:
   a drive mechanism having a servomotor attached to and moveable with one of said axis and said support, and a rack attached to and moveable with the other of said axis and said support;
   a speed reducer operatively associated with said servomotor and providing direct drive to a timing belt, said speed reducer comprising an output shaft being concentric with a drive pin of said servomotor along a centerline, said output shaft having arms extending laterally of said centerline, with each of said arms supporting a bearing in frictional engagement with said drive pin at a point of tangency between said drive pin and each bearing, said speed reducer further comprising means for maintaining a force between said drive pin and each bearing at said tangency point sufficient to ensure rotation of said output shaft in concert with rotation of said drive pin; and
   said timing belt intermeshing with said rack such that forward and reverse rotation of said motor provides to and fro relative linear motion, respectively, between said axis and said support so as to displace said axis linearly along a Y coordinate and longitudinally of said rack.

5. An apparatus as in claim 4, wherein said force maintaining means comprises:
a reduced portion of each said laterally extending arm such that each bearing is biased into engagement with said drive pin by flexure of the corresponding arm at said reduced portion.

6. An apparatus as in claim 4, wherein said force maintaining means comprises:
a flexible ring surrounding said bearings and engaging each said bearing along a portion of a periphery thereof, said ring being fixed against rotation relative to a housing of said speed reducer and having an inner diameter less than a circle locus surrounding and tangent to each of said bearings.

* * * * *